United States Patent
Radke

(12) 
(10) Patent No.: US 6,248,145 B1
(45) Date of Patent: Jun. 19, 2001

(54) CLEANER FOR ROTATING AIR-INTAKE FILTER

(75) Inventor: Karl-Heinz Radke, Wilthen (DE)

(73) Assignee: Case Harvesting Systems GmbH, Neustadt (DE)

( * ) Notice: Subject to any disclaimer, the term of this patent is extended or adjusted under 35 U.S.C. 154(b) by 0 days.

(21) Appl. No.: 09/372,925

(22) Filed: Aug. 12, 1999

(30) Foreign Application Priority Data

Aug. 13, 1998 (DE) .............................. 198 36 696

(51) Int. Cl.$^7$ .................................................. B01D 46/00
(52) U.S. Cl. ........................ 55/295; 55/297; 55/385.3
(58) Field of Search .................... 55/385.3, 289, 55/295, 296, 297

(56) References Cited

U.S. PATENT DOCUMENTS

| | | | | |
|---|---|---|---|---|
| 2,886,016 | * | 5/1959 | Ashton | 55/385.3 |
| 2,896,594 | * | 7/1959 | Ashton | 55/385.3 |
| 3,155,083 | * | 11/1964 | Middlesworth et al. | 55/385.3 |
| 3,565,203 | * | 2/1971 | Ashton et al. | 55/385.3 |
| 3,630,003 | * | 12/1971 | Ashton et al. | 55/385.3 |
| 3,837,149 | * | 9/1974 | West et al. | 55/385.3 |
| 4,233,040 | * | 11/1980 | Vogelaar et al. | 55/385.3 |
| 4,299,603 | * | 11/1981 | Friesen | 55/385.3 |
| 4,439,218 | * | 3/1984 | Priepke et al. | 55/297 |
| 5,735,337 | * | 4/1998 | Edwards | 55/385.3 |

FOREIGN PATENT DOCUMENTS

| | | |
|---|---|---|
| 453597 | 12/1927 | (DE) . |
| 40 33 204 | 4/1992 | (DE) . |
| 44 04 401 | 8/1995 | (DE) . |
| 195 46 321 | 6/1996 | (DE) . |
| 195 47 348 | 7/1997 | (DE) . |
| 0 269 765 | 6/1988 | (EP) . |
| 313763 | * 5/1989 | (EP) . |
| 0 489 975 | 6/1992 | (EP) . |
| 08049540 | 2/1996 | (JP) . |
| 8 4950 | 2/1996 | (JP) . |

* cited by examiner

*Primary Examiner*—Duane S. Smith
(74) *Attorney, Agent, or Firm*—Herbert Dubno; Andrew Wilford

(57) ABSTRACT

An agricultural machine has a cooling fan with an intake covered by a filter centered on and rotating about an axis. A cleaning apparatus for the filter has a hood nonrotatable about the axis and engaged over only a small portion of an outer face of the filter, a rotatable brush inside the filter fixed in axial alignment with the hood and having bristles engaging through holes in the filter at the hood so that the bristles free particles stuck in the holes, and a fan connected to the hood for exhausting air therefrom along with particles freed by the bristles. The filter has an axially directed and radially extending end and an axially extending and radially directed side. The rotatable brush engages an inner face of the end of the filter and the apparatus includes a second rotatable brush separate from the first-mentioned rotatable brush and engaging an inner face of the side of the filter. The first brush is generally frustoconical and the second brush is generally cylindrical.

9 Claims, 5 Drawing Sheets

CLEANER FOR ROTATING AIR-INTAKE FILTER

FIELD OF THE INVENTION

The present invention relates to a rotating air-intake filter of the type used on automotive agricultural vehicles. More particularly this invention concerns a cleaner for such a filter.

BACKGROUND OF THE INVENTION

Most agricultural vehicles rely on substantial air cooling for their engines, drives, even air-conditioning systems. Since, however, these vehicles typically work in fairly dusty and dirty circumstances, it is necessary to filter the air before running it over or through the various heat exchangers the vehicle might have.

Accordingly it is standard practice to form the air-intake filter as a perforated drum centered on an axis and having an axially directed perforated end and a radially directed perforated side. The drum is rotated about its axis and a cleaning device is provided which covers a pie-shaped segment of the drum, so that each time the drum rotates it passes through the cleaner and in theory any particles on outer faces of the drum are removed.

European 0,269,765 describes a cleaning device that has a pressure tube whose rear end is in the air stream downstream of the fan and upstream of the cooler so that there is constantly air flow back through it. Directly behind its end the tube is bent through 180° and extends with its upwardly open part along the outer surface of the rotating coolant filter. In another embodiment the pressure tube lies with its open part at a slight spacing in front of the outer end face of the rotating coolant filter. In both cases the thus channeled air flow of the tube blows particles out of the holes of the rotating coolant filter, or at least blows out those particles that are fairly light and are not lodged in place. Since the air flow only runs along the described surface region it cannot free particles stuck on the outer surface of the coolant filter or particles lodged in its holes. In addition the air current is not very effective since the air intake end of the tube has a very small flow cross section and the various deviations from a straight path cause a considerable loss of static pressure.

Another variant is known from German 195 46 321 wherein the rotating coolant filter is mounted on a stationary tube whose one end is closed. Its open ends holds a pressure tube that again engages with its bent-over end in the air stream downstream of the heat exchanger or the fan. In the region inside the coolant filter the tube, which carries the filter, is formed on its lower side with a hole on which an downwardly open outlet is connected that extends close to the surface and reaches over a portion of the end of the rotating filter. Underneath the outlet is a separating passage for leading off the dislodged particles of crop and dirt. The disadvantage of this solution is once again the limited effectiveness of the feeble air flow since the flow cross section of the bent end of the tube is too small and the tube's path is to circuitous. Although blow cleaning of the filter is basically preferable to a surface blowing-away as in the system of above-mentioned EP 0,269,765, the overall cleaning capacity of this system is unacceptable.

A system working in principle the same way is seen in German 40 33 204 and 195 47 348. It only differs in the suction fan used. Here a housing is set from outside on the end and side of the coolant filter that is at least partially open on its side directly juxtaposed with the filter. The surface of the filter covered by this housing is only a small fraction of its overall surface area so that it does not significantly reduce air flow through the filter. This housing is connected to the intake of a separate fan via a flexible tube so as to vacuum particles off the outside face of the filter and expel them remotely. Inside the filter directly across from this housing is a shield in the shape of a planar plate that prevents air from flowing through the filter at this location so that the suction of the particle fan is not working against the suction of the coolant fan. Such a device is not highly effective in removing particles adhered to the outer filter face or lodged in its openings.

Another system described in German 44 04 401 has a shield formed as an inner housing that is open toward the inner face of the filter. The thus formed opening of the inner housing is substantially larger than that of the outer housing that is connected to the intake of the particle fan so that some air flow through the filter is possible, in a direction that is the reverse of the direction of the cooling air. The disadvantage of this system is that air is sucked in the normal direction through the filter into the inner housing and then reversed and sucked out, so that this flow can effectively lodge particles in the holes so they cannot be dislodged by simple air flow. As in the other above-described systems, the filter therefore require periodic manual cleaning.

OBJECTS OF THE INVENTION

It is therefore an object of the present invention to provide an improved cleaning device for the rotating air-intake filter of an agricultural machine.

Another object is the provision of such an improved cleaning device for the rotating air-intake filter of an agricultural machine which overcomes the above-given disadvantages, that is which effectively and automatically cleans the filter.

SUMMARY OF THE INVENTION

An agricultural machine has a cooling fan with an intake covered by a filter centered on and rotating about an axis. A cleaning apparatus for the filter has according to the invention a hood nonrotatable about the axis and engaged over only a small portion of an outer face of the filter, a rotatable brush inside the filter fixed in axial alignment with the hood and having bristles engaging through holes in the filter at the hood so that the bristles free particles stuck in the holes, and a particle fan connected to the hood for exhausting air therefrom along with particles freed by the bristles.

Thus with this system the brush actively dislodges any particles in the holes so they can be aspirated by the particle fan. The system can be counted on to thoroughly clean the filter drum on each rotation so that it will remain clear. The surface area of the filter covered by the hood is relatively small and corresponds to the area where the bristles are poking through the filter's holes, so that extremely effective operation is ensured.

According to the invention the drum has an axially directed and radially extending end and an axially extending and radially directed side. The rotatable brush engages an inner face of the end of the filter and the apparatus includes a second rotatable brush separate from the first-mentioned rotatable brush and engaging an inner face of the side of the filter. Normally the first brush is generally frustoconical and the second brush is generally cylindrical and the brushes are rotatable about respective axes.

The axis of the first brush according to the invention extends transversely across the axis of the filter and the axis of the second brush extends generally parallel to the axis of the filter. In addition means is provided for rotating the brush which has means for pressing the brush against the filter and for poking the bristles through the holes. This last-mentioned means includes a pair of lever arms each having one end carrying the brush, a center pivot, and an opposite end, and springs engaging the opposite ends and urging the brush against the filter.

In addition the system of this invention has a brush housing nonrotatably fixed relative to the axis inside the filter, having an edge closely juxtaposed with an inner surface of the filter, and forming a compartment open toward the filter and holding the brush.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
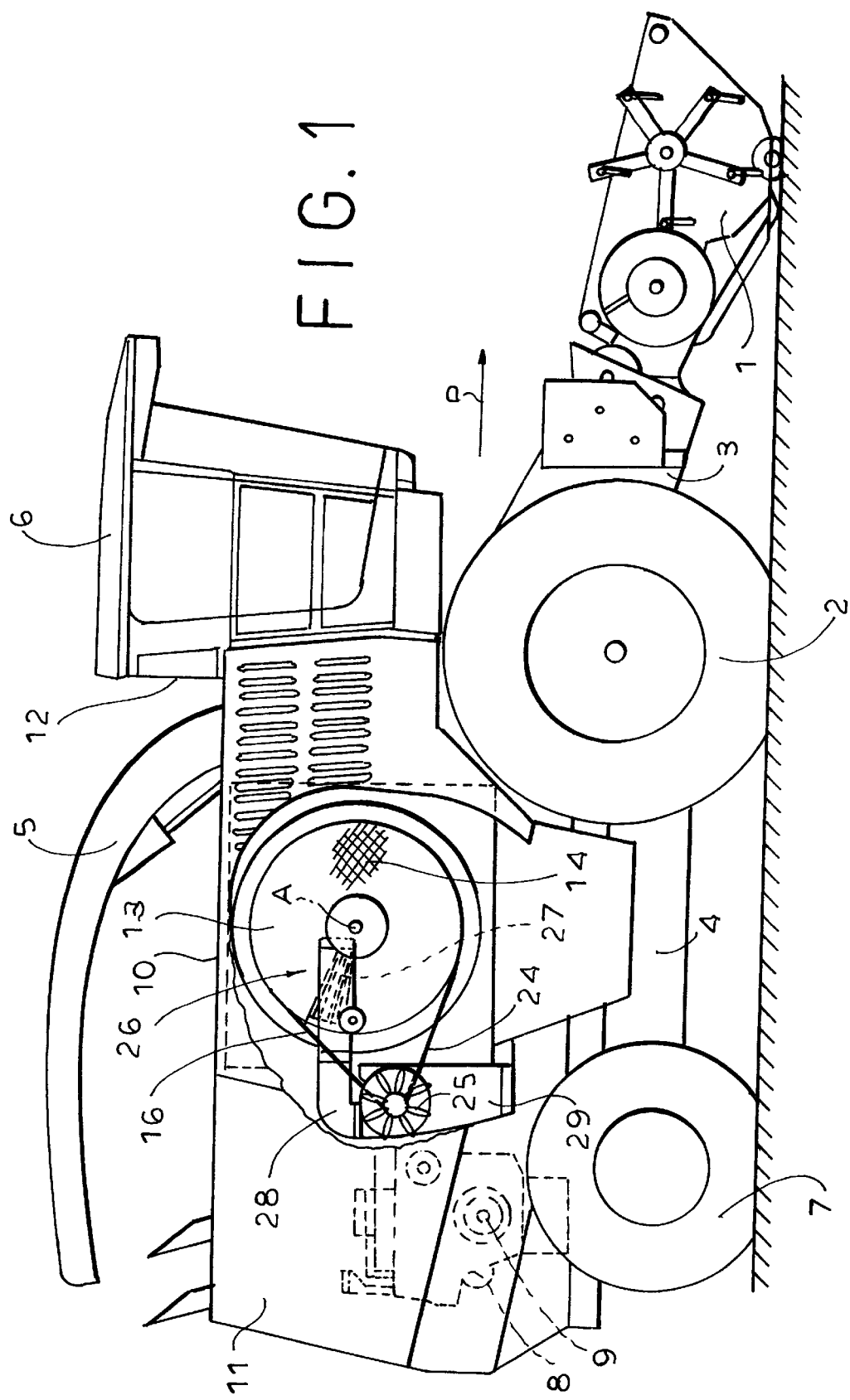
FIG. 1 is a small-scale side view of the machine according to the invention with some parts removed for clarity of view.

As seen in FIG. 1 an automotive agricultural vehicle, here a harvester, has a frame 4 supported by front wheels 2 and back wheels 7 on the ground for movement in a normal travel direction D and carrying an operator cabin 6. It carries on its front end a pickup or adapter 1 and chopper 3 and expels cut crop at an outlet chute 5. An engine 8 sitting between the back wheels 7 is held inside a cover 11 that extends up to a rear wall 12 of the cabin 6 and has an output 9.

A large-capacity cooling fan 10 having a housing 17 (FIG. 3) draws air in through a rotating drum-shaped filter 13 and passes it through various heat exchangers and over the engine 7. A brush-type seal 18 is provided between the edge of the filter 13 and the housing 17 to prevent leaks between these two relatively moving parts. The filter 13 is cylindrically cup-shaped and centered on an axis A, with an axially directed end 15 and a cylindrical and radially directed side 16, both formed as a screen or mesh with an array of small holes 14 through which air is drawn by the fan 10. A shaft 19 on the axis A is fixed to the fan housing 17 by a flange 20 and carries a pair of axially spaced bearings 21 and 21' on which the filter 13 is mounted. An inner edge of the filter 13 is formed with a pulley groove 22 and is supported by radially extending arms 23 on the inner bearing 21', A belt 24 driven by a separate fan 25 described below serves to rotate the drum filter 13 about the axis A continuously.

Figure 2:
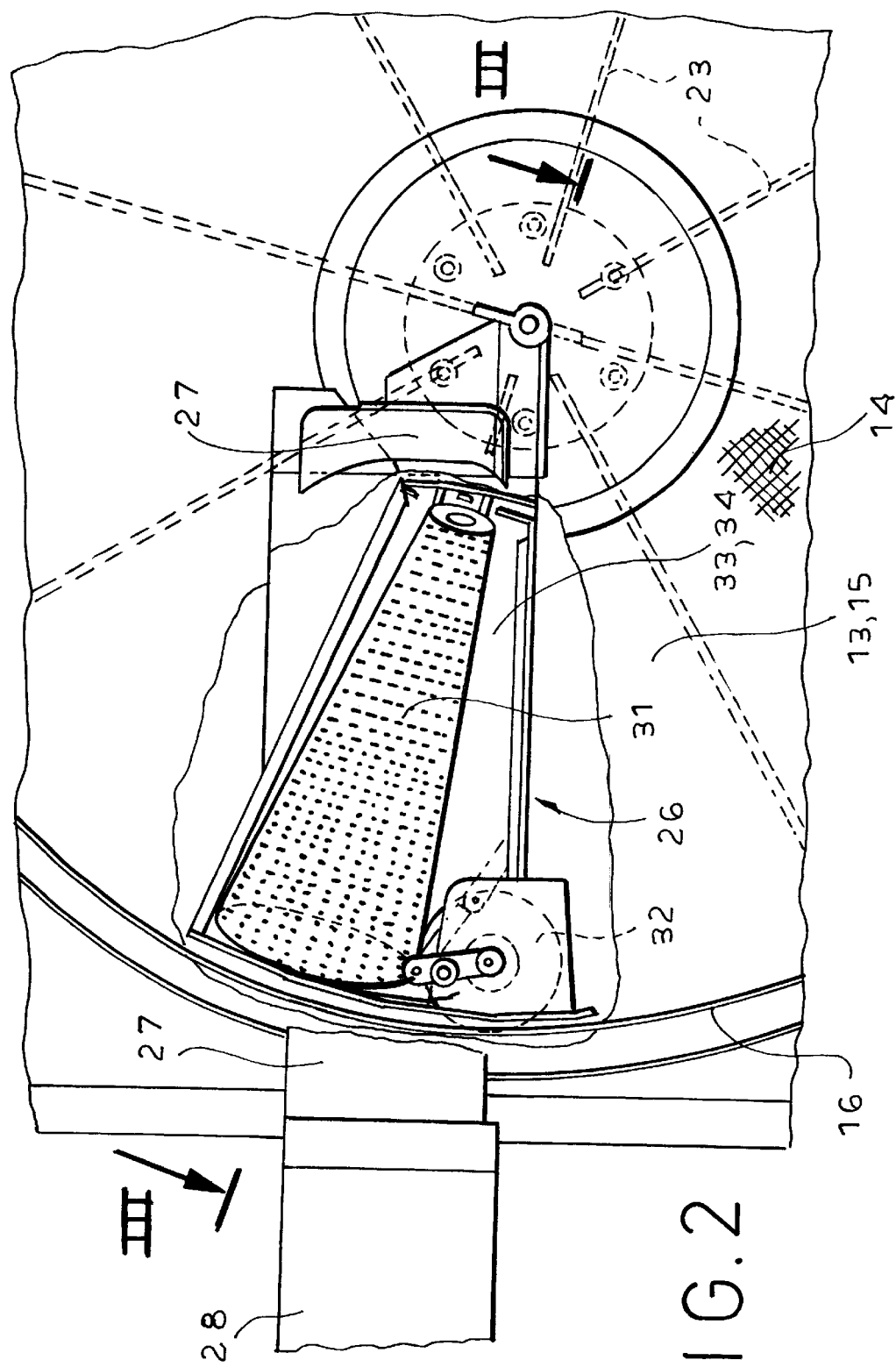
FIG. 2 is a larger-scale view of a detail of the machine showing the cleaning device according to the invention.
Figure 3:
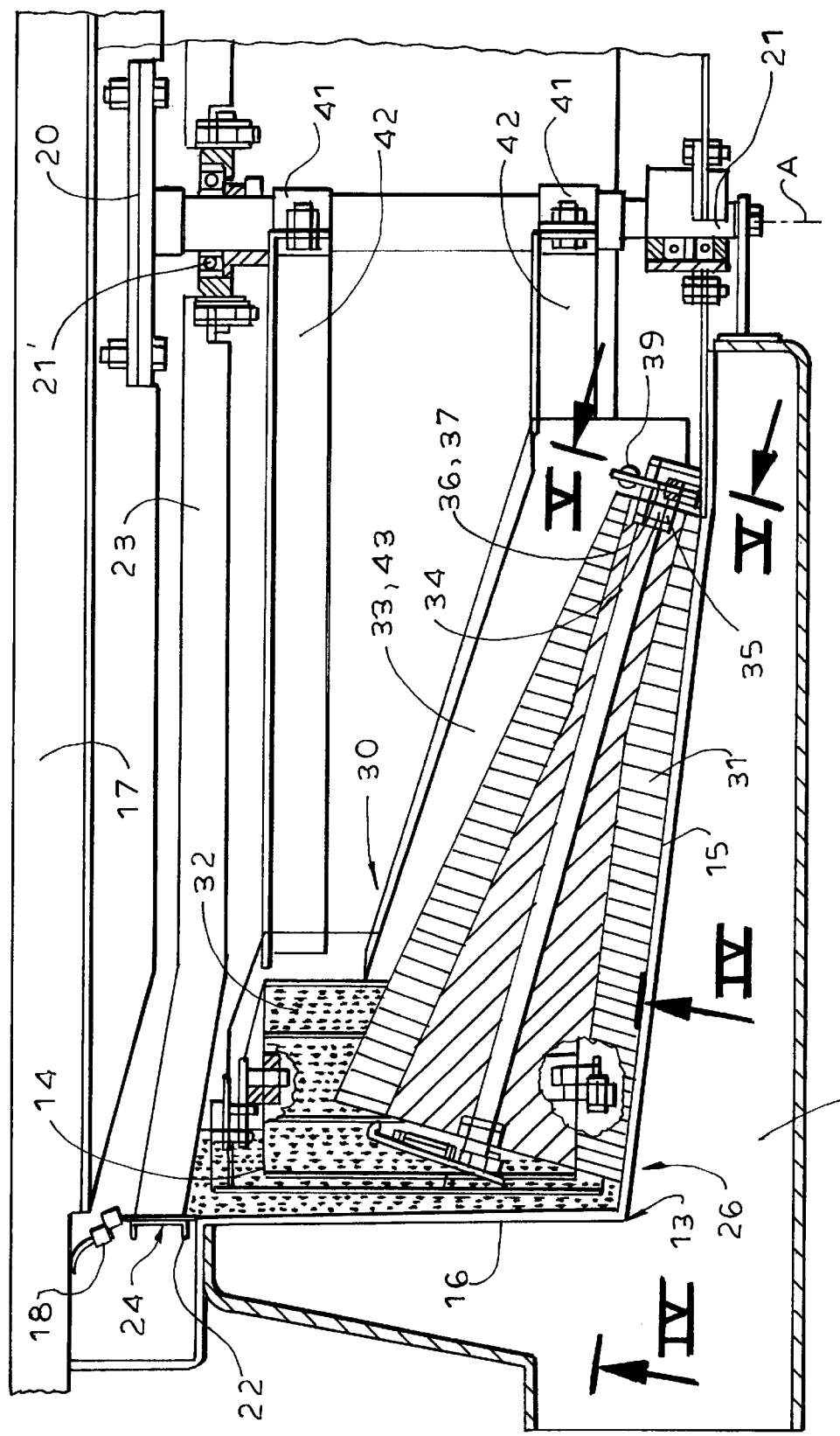
FIG. 3 is a section taken along line III—III of FIG. 2.

In accordance with the invention as better shown in FIGS. 2 and 3 a cleaning device 26 has outside the drum filter 13 a pie-shaped cleaning hood or housing 27 secured at the outer end of the shaft 19 and covering a small portion of the end 15 and side 16, with its edge in close juxtaposition to outer surfaces of the filter 13. This hood 27 is connected via a conduit 28 to the input of the fan 25 whose output 29 is directed downward, away from the filter 13. Thus the suction of the fan 25 is effective over the small portion of the end 15 and side 16 that are covered by the hood 27, with air flow being in a direction opposite that through the rest of the filter 13. At the same time when the fan 25 is operating, it drives the filter 13 by means of the belt 24 for rotation about the axis A.

Inside the drum filter 13 is a brush assembly 30 comprising a radially extending frustoconical brush 31 whose bristles 45 engage the back of the end 15 and an axially extending cylindrical brush 32 whose bristles 45 engage the inside of the side 16. These brushes 31 and 32 are secured on a mount or housing 33 defining compartments 43 and 44 for the brushes 30 and 31 and secured by radially extending struts 42 to clamps 41 fixed to the shaft 19, so that this housing 33 is fixed inside the drum filter 13 in axial alignment with the hood 27. Edges of the housing 33 are closely juxtaposed with inner surfaces of the filter 13.

Figure 4:
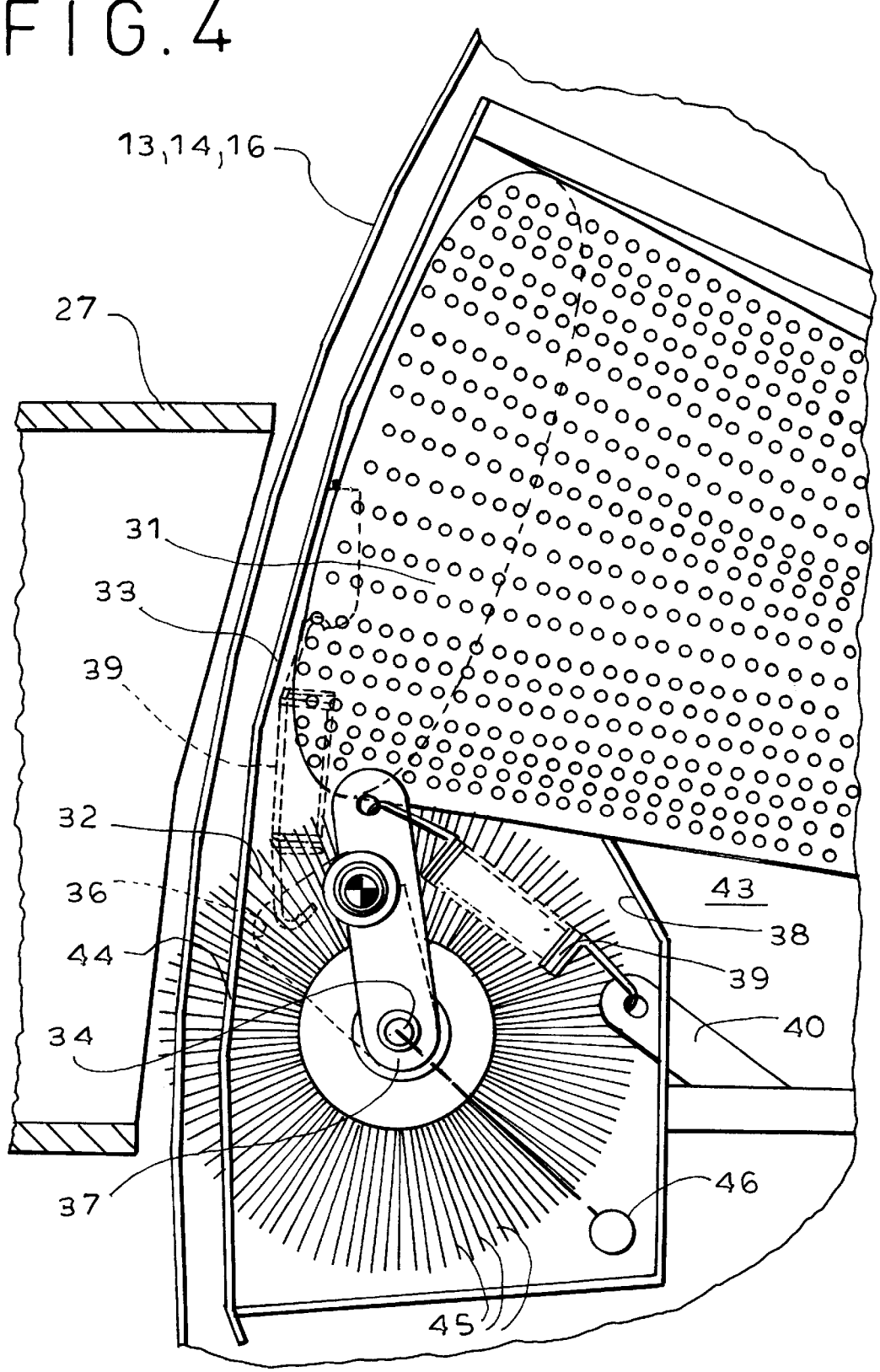
FIGS. 4 and 5 are sections taken along respective lines IV—IV and V—V of FIG. 3.
Figure 5:
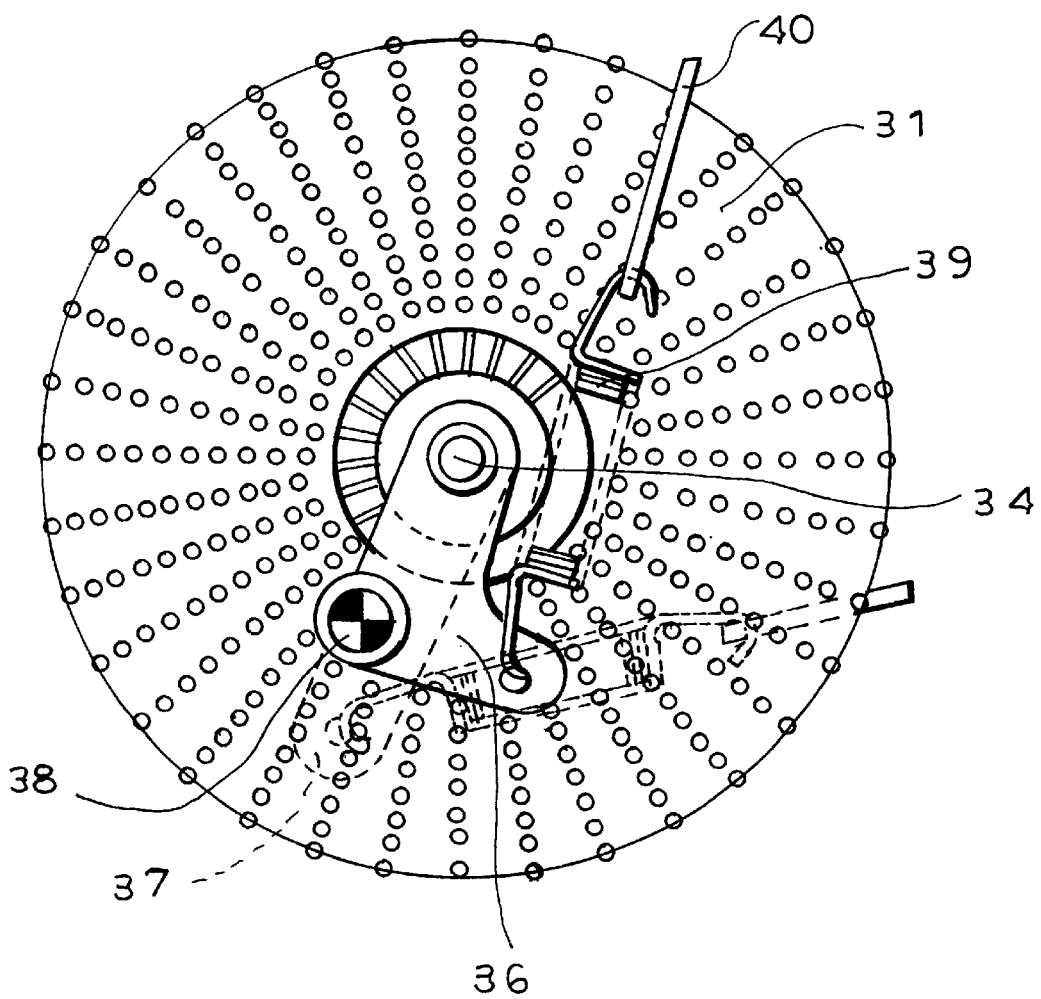

Each of the brushes 31 and 32 as shown in FIGS. 4 and 5 has on its rotation axis end pins 34 seated in bearings 35 one of which is seated at one end of an L-shaped lever 36 and the other of which is seated at one end of a straight lever 37. The levers 36 and 37 are centrally pivoted at 38 on the housing 33 and respective tension springs 39 each have one end hooked into the lever end opposite the respective bearing 35 and an opposite end secured to the housing 33 at an anchor tab 40. Thus the four springs 39 force the bristles 45 of the brushes 31 and 32 through the holes 14 in the drum filter 13.

Since the housing 27 blocks air flow axially toward the brush assembly 30 through that portion of the filter 13 it covers and since the fan 25 is continuously sucking air out through the housing 27, the bristles 45 will dislodge any particles stuck in the holes 14 so they can be aspirated by the fan 25 and expelled at 29. Motors such as indicated schematically at 26 in FIG. 4 can be provided to rotate the brushes 31 and 32 so that the bristles 45 move synchronously with the end 15 and side 16.

I claim:

1. In an agricultural machine having a cooling fan with an intake covered by a filter centered on and rotating about about an axis, a cleaning apparatus comprising:

a hood nonrotatable about the axis and engaged over only a small portion of an outer face of the filter;

a rotatable brush inside the filter fixed in alignment with the hood and having bristles;

means for pressing the brush against the filter and poking the bristles through holes in the filter and into the hood to free particles stuck in the holes and push them outward into the hood; and fan means connected to the hood for exhausting air there from along with particles freed by the bristles.

2. The filter-cleaning apparatus defined in claim 1 wherein the filter has an axially directed and radially extending end and an axially extending and radially directed side.

3. In an agricultural machine having a cooling fan with an intake covered by a filter centered on and rotating about an axis and having an axially directed and radially extending end and an axially extending and radially directed side, a cleaning apparatus comprising:

a hood nonrotatable about the axis and engaged over only a small portion of an outer face of the filter:

a first rotatable brush inside the filter fixed in axial alignment with the hood and having bristles engaging through holes in the filter at the hood from an inner face of the end of the filter;

a second rotatable brush separate from the first-mentioned rotatable brush and engaging an inner face of the side of the filter, whereby the bristles free particles stuck in the holes; and fan means connected to the hood for exhausting air therefrom along with particles freed by the bristles.

4. The filter-cleaning apparatus defined in claim 3 wherein the first brush is generally frustoconical and the second brush is generally cylindrical.

5. The filter-cleaning apparatus defined in claim 3 wherein the brushes are rotatable about respective axes.

6. The filter-cleaning apparatus defined in claim 5 wherein the axis of the first brush extends transversely across the axis of the filter and the axis of the second brush extends generally parallel to the axis of the filter.

7. The filter-cleaning apparatus defined in claim 1, further comprising means for rotating the brush.

8. The filter-cleaning apparatus defined in claim 1 wherein the pressing means includes a pair of lever arms each having one end carrying the brush, a center pivot, and an opposite end; and spring means engaging the opposite ends and urging the brush against the filter.

9. The filter-cleaning apparatus defined in claim 1, further comprising a brush housing nonrotatably fixed relative to the axis inside the filter, having an edge closely juxtaposed with an inner surface of the filter, and forming a compartment open toward the filter and holding the brush.

\* \* \* \* \*